(12) United States Patent
Lawrence et al.

(10) Patent No.: US 10,473,067 B1
(45) Date of Patent: Nov. 12, 2019

(54) AIR SHUTOFF VALVE

(71) Applicant: Caterpillar Inc., Deerfield, IL (US)

(72) Inventors: Rodney A. Lawrence, Frankfort, IN (US); Bradley J. Shaffer, Romney, IN (US); Brandyn A. Stack, Lafayette, IN (US); Joseph John Stabnik, Rensselaer, IN (US); Eric W. Ferguson, Cottage Grove, MN (US); Yegor Litvinov, Shakopee, MN (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 15/989,822

(22) Filed: May 25, 2018

(51) Int. Cl.
*F16K 3/02* (2006.01)
*F02M 35/10* (2006.01)
*F16K 35/02* (2006.01)
*F16K 31/46* (2006.01)
*F16K 31/524* (2006.01)

(52) U.S. Cl.
CPC ..... *F02M 35/10255* (2013.01); *F16K 3/0254* (2013.01); *F16K 3/0281* (2013.01); *F16K 31/465* (2013.01); *F16K 31/52416* (2013.01); *F16K 35/025* (2013.01)

(58) Field of Classification Search
CPC ............ F02M 35/10255; F16K 35/025; F16K 31/52416; F16K 31/465; F16K 3/0281; F16K 3/0254; F16K 35/022; F16K 31/52408; F16K 31/524; F16K 31/52

USPC ............... 251/326–329, 251–263, 111, 294
See application file for complete search history.

(56) References Cited

U.S. PATENT DOCUMENTS

| | | | | |
|---|---|---|---|---|
| 789,132 | A * | 5/1905 | Bachman | F16K 3/312 138/94.3 |
| 2,884,222 | A * | 4/1959 | Oakes | F16K 3/0254 251/327 |
| 3,082,785 | A | 3/1963 | Radway | |
| 3,955,792 | A * | 5/1976 | Cho | F16K 31/047 251/69 |
| 4,457,334 | A | 7/1984 | Becker et al. | |
| 4,501,238 | A * | 2/1985 | Odum | F02D 9/14 123/198 D |
| 4,537,386 | A * | 8/1985 | Krepela | F02D 17/04 251/302 |
| 4,546,954 | A * | 10/1985 | Bodnar | F16K 3/04 251/113 |
| 4,871,143 | A * | 10/1989 | Baker | F16K 3/0254 251/58 |
| 6,000,675 | A * | 12/1999 | Eggleston | F16K 31/1655 251/229 |
| 6,273,053 | B1 | 8/2001 | Krepela et al. | |

* cited by examiner

*Primary Examiner* — John Bastianelli
(74) *Attorney, Agent, or Firm* — Leydig, Voit & Mayer, LTD.

(57) ABSTRACT

An air shutoff valve for use on an internal combustion engine includes a gate that is moveable between armed and triggered positions by springs when a release pin is retracted and allows a spring loaded retention pin to retract and release the gate, which is also spring loaded, to drop. The release pin is operated by an actuator.

20 Claims, 10 Drawing Sheets

AIR SHUTOFF VALVE

TECHNICAL FIELD

This patent disclosure relates generally to internal combustion engines and, more particularly, to air shutoff valves used on internal combustion engines.

BACKGROUND

Certain types of internal combustion engines, including engines that include reciprocating pistons, are typically operated by controlling either the air or fuel provided into the cylinders of the engine. For example, spark ignition engines such as gas or gasoline engines control engine speed by metering an amount of air that is provided to the engine, measuring the amount of air, and providing a controlled amount of fuel to achieve a desired air/fuel ratio. Similarly, compression combustion engines such as diesel or oil engines control engine speed by metering the amount of fuel that is provided to the engine's cylinders. In any event, internal combustion engines require at least air and fuel to form a combustible air/fuel mixture in the engine's cylinders to operate. If provision of fuel or air is discontinued, then operation of the engine would be discontinued or prevented from initiating.

In certain conditions, for example, in the presence of a failure, it is desirable to inhibit engine operation for reasons of safety. In yet other conditions, a failure in an engine component may result in an uncontrolled flow of fuel (or air) into the engine, which can create a condition of uncontrolled engine operation. One previously proposed solution at disabling engine operation during either a safety lockout or in the presence of an engine component failure is to introduce an air shutoff valve at a point in the engine's air intake system, which operates to shut off an airflow into the engine.

One example of an air shutoff valve that has been proposed in the past can be found in U.S. Pat. No. 4,546,954, which was granted on Oct. 15, 1985. This reference describes an air shutoff valve having a paddle-shaped valve element that includes a circular gate and an actuation arm. The actuation arm pivots at one end under a force of an actuator (see, e.g., FIG. 3a) to swing the gate valve into and out from an air passage opening.

One disadvantage of existing air shutoff valves such as the valve described in the '954 patent mentioned above, is that a large actuator force is required to move the valve element when the valve is required to be used. Moreover, placement of the valve on the engine's intake system, which is usually high on the engine, subjects the valve to vibration and wear of internal components such as linkages and the like.

SUMMARY

The disclosure describes, in one aspect, an air shutoff valve for use on an internal combustion engine. The air shutoff valve includes a body having an inlet portion forming an inlet opening, an outlet portion forming an outlet opening, a gate portion and an actuator portion. The body forms an air passage that fluidly connects the inlet opening and the outlet opening. The gate is slidably disposed in the gate portion of the body and is selectively moveable between an armed position and a triggered position, in which triggered position the gate is disposed in the air passage and fluidly blocks the outlet opening from the inlet opening. A lift rod is connected to the gate and includes a transverse opening. A retention pin is slidably disposed in the actuator portion of the body and has a tip extending through the transverse opening in the lift rod when the gate is in the armed position. A release pin is disposed in a release opening formed in the retention pin when the gate is in the armed position. The release pin prevents sliding motion of the retention pin relative to the body when the release pin is in an extended position. An actuator is connected to the release pin and operates to move the release pin from the extended position to a retracted position, in which the release pin is clear of the retention pin. At least one resilient element is disposed between the body and the retention pin. The at least one spring is disposed to urge the retention pin in a direction away from the lift rod. At least one lift spring is disposed between the body and the gate. The at least one lift spring is disposed to urge the gate towards the triggered position.

In another aspect, the disclosure describes an air shutoff valve for an internal combustion engine, which includes a gate valve element slidably disposed within a body of the valve and operating to selectively fluid connect or block an air passage, the gate valve element moving along a guillotine axis between a retracted position, in which the air passage is clear, and an extended position, in which the air passage is blocked. The air shutoff valve further includes a linear actuator operating between a default, extended actuator position and an active, retracted actuator position, a release pin disposed to move with the linear actuator between the extended and retracted actuator positions, a retention pin slidably disposed in the body of the valve, the retention pin having an opening that accepts therein a portion of the release pin, at least one resilient element disposed between the body of the valve and the retention pin, the at least one spring urging the retention pin in one direction, a lift rod connected to the gate valve element, the lift rod having an elongate opening that accepts therein a tip of the retention pin, and at least one lift spring disposed between the body of the valve and the gate valve element, the at least one lift spring urging the gate valve element towards the extended position.

In yet another aspect, the disclosure describes an air shutoff valve for an internal combustion engine, which includes a body forming an air passage that fluidly connects and inlet opening with an outlet opening, a gate slidably disposed in the body and being selectively moveable along a gate axis between an armed position and a triggered position, in which the air passage is fluidly blocked, a lift rod connected to the gate and including a transverse opening, a retention pin slidably disposed in the body along a retention axis and having a tip extending through the transverse opening in the lift rod when the gate is in the armed position, a release pin disposed in a release opening formed in the retention pin when the gate is in the armed position, the release pin preventing sliding motion of the retention pin relative to the body when the release pin is in an extended position, an actuator connected to the release pin and operating to move the release pin along an actuator axis from the extended position to a retracted position, in which the release pin is clear of the retention pin, at least one resilient element disposed between the body and the retention pin, the at least one spring disposed to urge the retention pin in a direction away from the lift rod, and at least one lift spring disposed between the body and the gate, the at least one lift spring disposed to urge the gate towards the triggered position. In one embodiment, the gate axis and the actuator axis are parallel, and the actuator axis and the retention axis are perpendicular.

DETAILED DESCRIPTION

Figure 1:
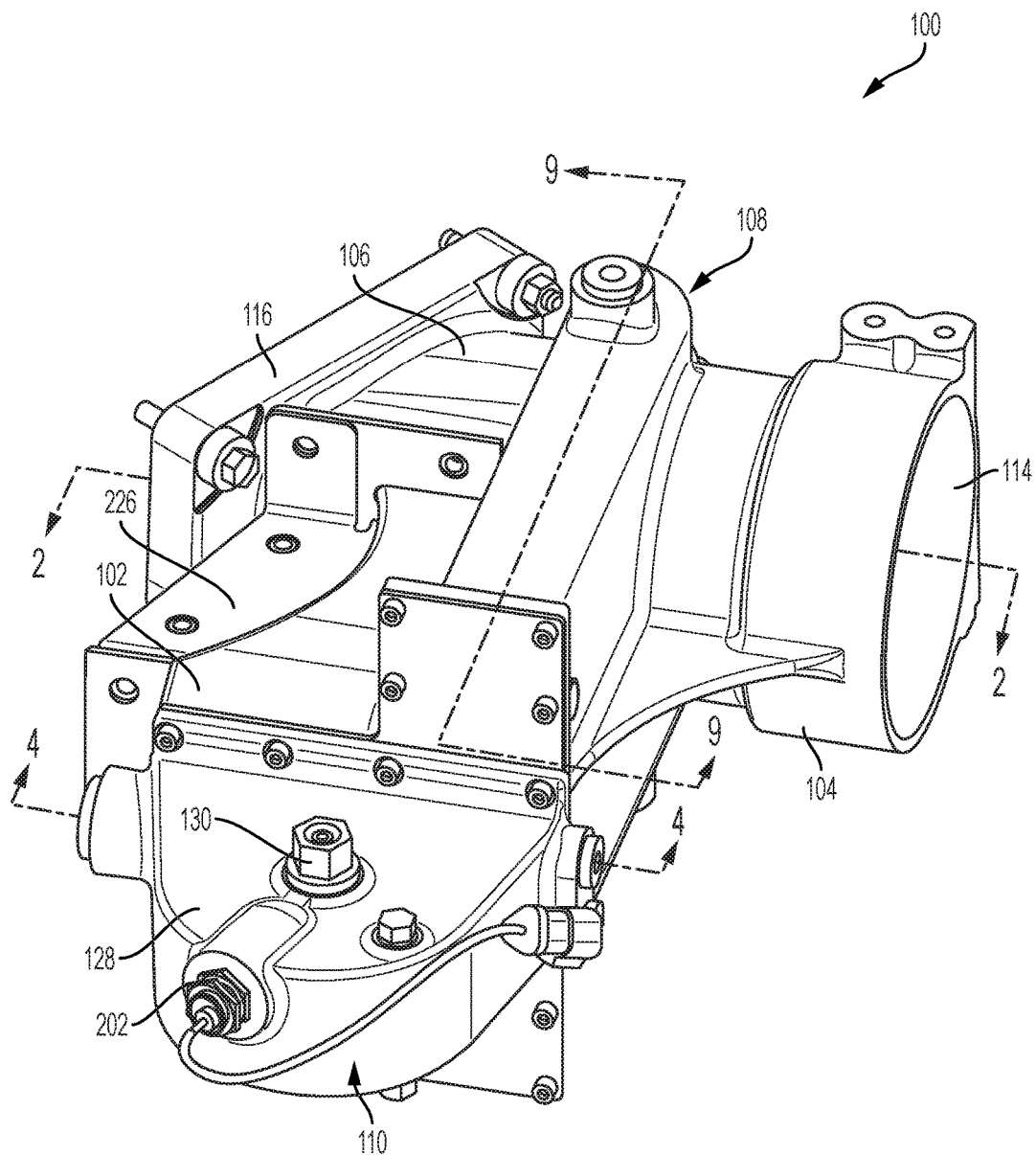
FIG. 1 is an outline view of an air shutoff valve for use with an internal combustion engine in accordance with the disclosure.

An outline view of an air shutoff valve (ASV) 100 is shown in FIG. 1. The ASV 100 includes a body 102 having an inlet portion 104, an outlet portion 106, a gate portion 108, and an actuator portion 110. In the illustrated embodiment, the ASV 100 is a two-way, binary valve that can operate in an open position, in which fluid communication is permitted between the inlet and outlet portions 104 and 106, and a closed position, in which a gate valve element 112 (shown in the cross section of FIG. 2) is moved by an actuator and linkage mechanism within the actuator portion 110 to a position that blocks fluid communication between the inlet and outlet portions 104 and 106. Stated differently, the ASV 100 operates between an armed state, in which it stand ready to close if needed, and a triggered state, in which the ASV 100 is closed to prevent engine operation. As shown, the inlet portion 104 includes a female bore 114 that accepts therein an air pipe (not shown) carrying an engine inlet air stream during operation, but any other connection arrangement can be used. The outlet portion 106 includes a flange 116 that is mountable with fasteners to an intake manifold (not shown) of an engine.

An air passage 118 (FIG. 2) connects the inlet and outlet portions 104 and 106 and extends through the body 102 to carry the inlet air stream from the female bore 114 to an opening in the flange 116. The flange 116 is exemplary of an air connection to the body 102 of the valve and can be replaced by any other appropriate connection structure. In the illustrated embodiment, when the gate 112 is in the closed position, fluid transfer through the air passage 118 is blocked or prevented. When in the open position, the gate 112 is retracted into the body 102 to allow the relatively unobstructed passage of fluids through the air passage 118. The gate 112 has a generally cylindrical shape that matches the circular cross sectional flow area of the air passage 118, but other shapes can be used.

Figure 2:
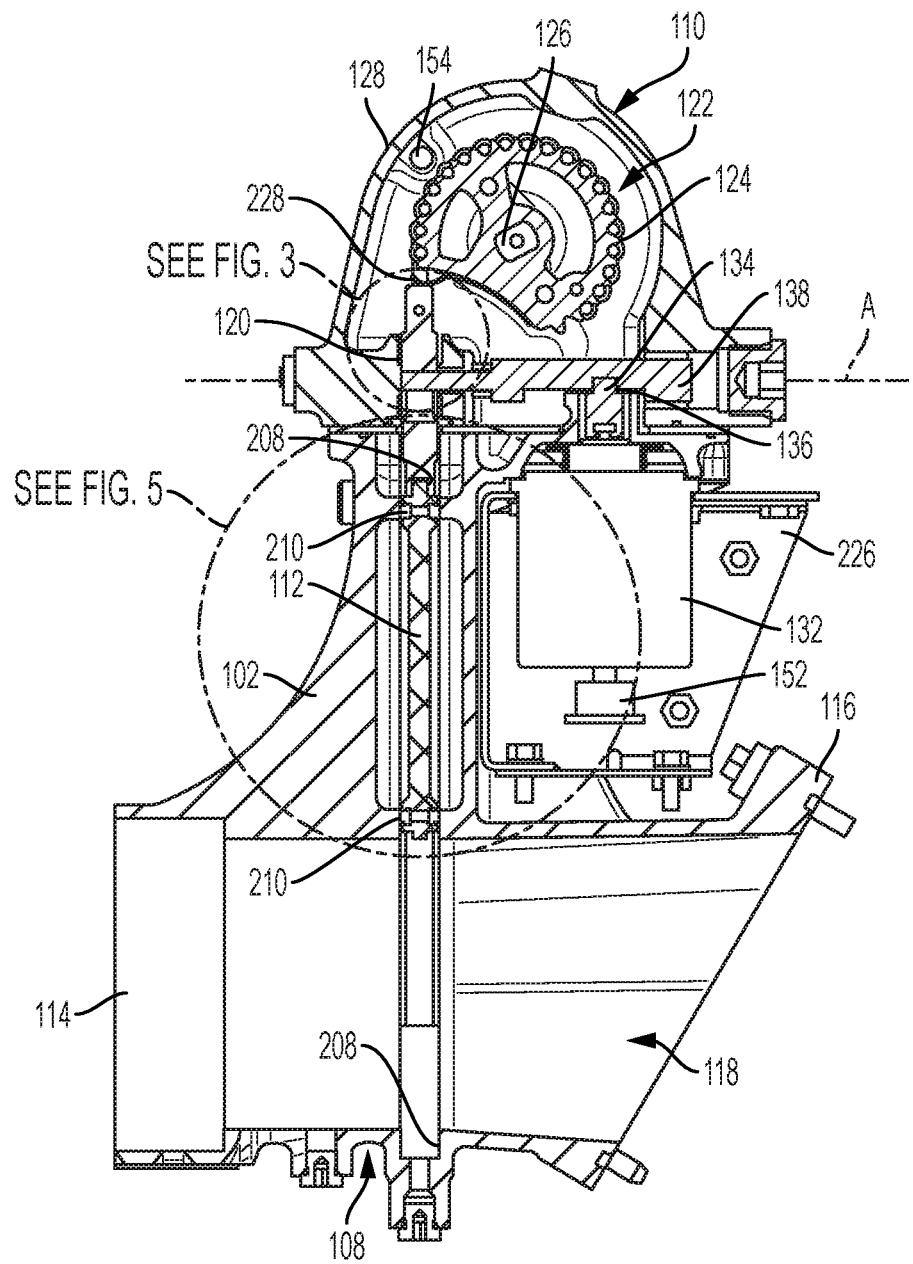
FIG. 2 is a cross section through the valve shown in FIG. 1.

During operation, the gate 112 may be raised or lowered, similar to a guillotine, with respect to the air passage 118 to open or block the air passage 118. As shown in FIG. 2, and also in at least FIGS. 3 and 4, the gate 112 is connected to a lift rod 120, which pulls the gate 112 from the closed position to the open position, shown in FIG. 2, and maintains the gate 112 in the lifted position. The lift rod 120 is connected to a chain 122 that meshably engages a sprocket 124 that pivots around a lift axle 126. As can be appreciated, the chain/sprocket arrangement shown herein is exemplary and can be replaced by another mechanical transmission arrangement such as a cable interacting with a pulley of any other tension carrying member. The lift axle 126 serves as the axis of rotation for the sprocket 124 and is perpendicular to a plane defined by a retention pin axis, and also a lift rod axis and an actuator axis. The lift and actuator axes are parallel and are both perpendicular to the retention pin axis. The lift, actuator and retention pin axes are coplanar. At one end, external to a cover 128, the lift axle 126 includes a driver 130, which is formed as a hexagonal nut and which can be manually turned to reset or lift the gate 112 to open the ASV 100 while the ASV 100 in a closed position.

Figure 3:
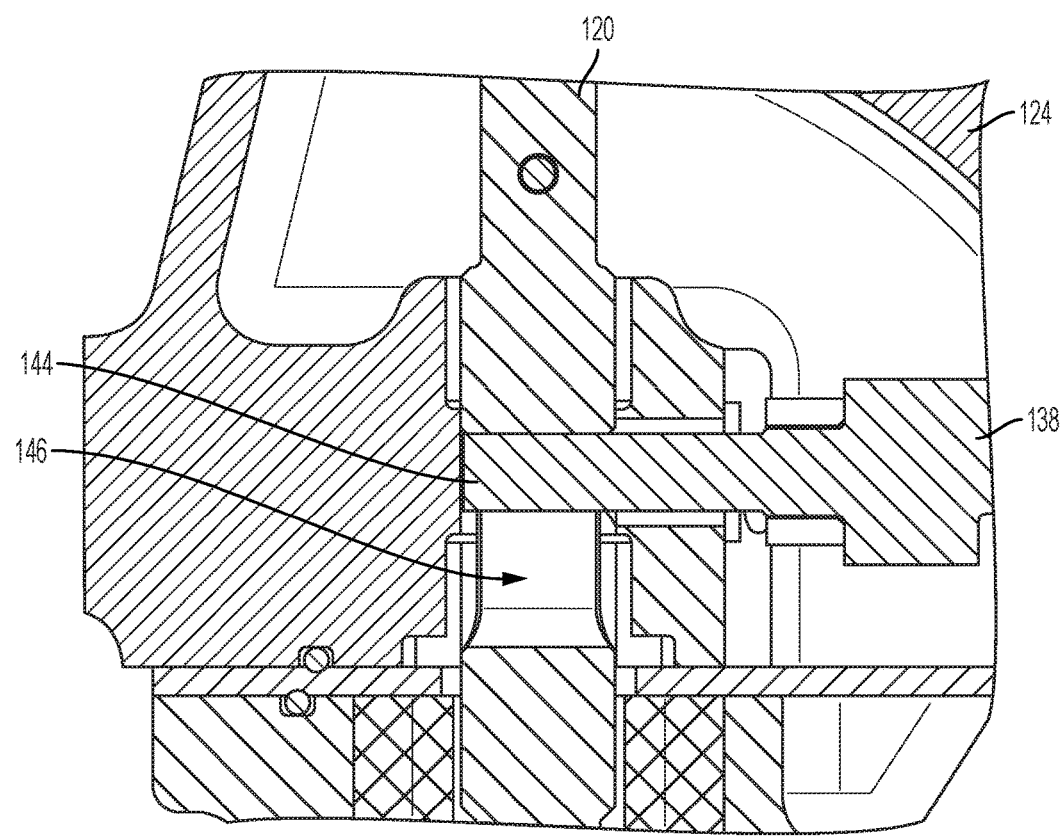
FIG. 3 is an enlarged detail of the cross section of FIG. 2.
Figure 4:
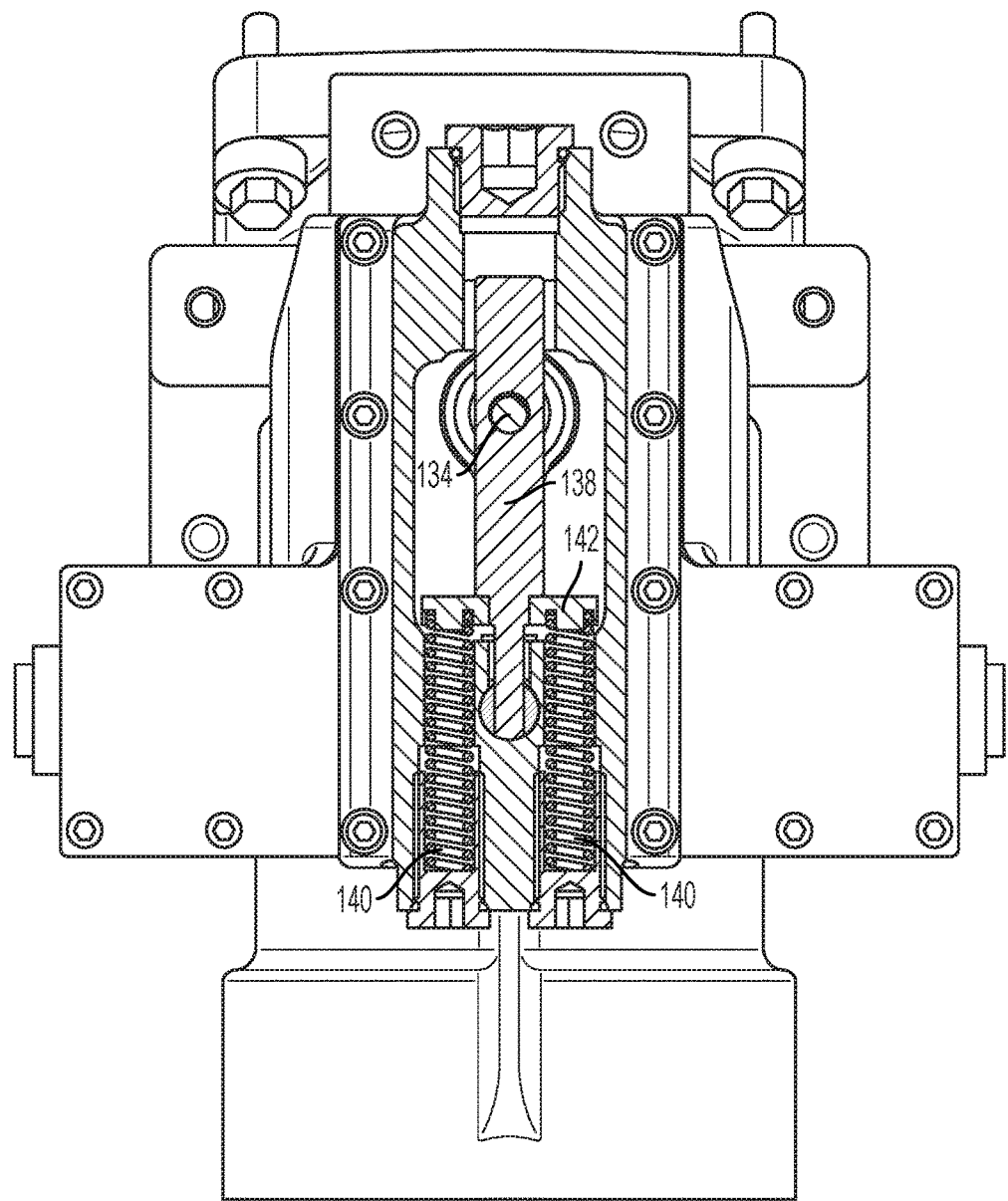
FIG. 4 is a cross section through a linkage portion of the valve of FIG. 1.

To activate or close the ASV 100, a signal may be provided to activate an actuator 132. The actuator 132, which is embodied in the illustrated device as an electrical solenoid actuator, includes a release pin 134 in an extended position. Activation of the actuator 132 causes the release pin 134 to retract. When in the default extended position, the release pin 134 is disposed within an opening 136 in a retention pin 138. As also shown in FIGS. 3 and 4, the retention pin 138 is slidably and reciprocally mounted within the ASV 100 in a perpendicular orientation relative to the release pin 134. The retention pin 138 is also spring loaded by two springs 140 (FIG. 4), which are shown here as coil springs that are kept in a compressed state while the release pin 134 is engaged in the opening 136 of the retention pin 138. As can be appreciated, the springs 140 can be replaced by at least one spring. Moreover, while two springs are shown, any other resilient element or set of elements can be used, including pneumatic and/or hydraulic actuation or tension devices. The spring restore force of the compressed springs 140 is communicated to the retention pin 138 via a saddle 142.

When a signal is received at the actuator 132 to trigger or energize the ASV 100 to close, an electrical signal causes the actuator 132 to energize, which operates to retract the release pin 134 towards the actuator 132 by a sufficient distance such that the release pin 134 clears the opening 136 and removes a retention that opposes the restore spring force of the springs 140. With no opposition to the spring force, the retention pin 138 snaps away from the springs 140 and the lift rod 120 of the gate 112 (towards the right, in the orientation shown in FIG. 2).

Figure 9:
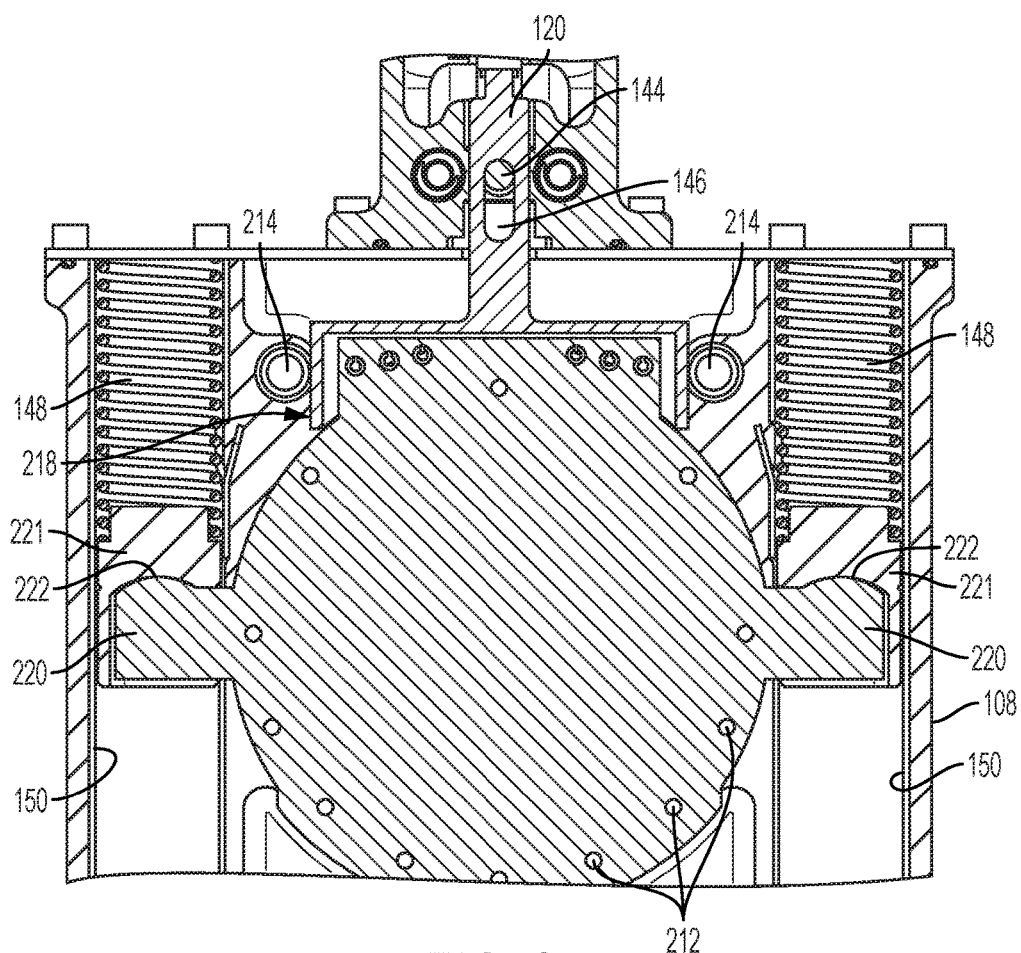

When the retention pin 138 moves towards the lift rod 120, an interference between a tip 144 of the retention pin 138 and an elongate slot 146 formed in the lift rod 120 removes a mechanical retention of the gate 112 in the lifted position, which permits the gate 112 to drop into the air passage 118. Motion of the gate 112 in the direction into the air passage 118 is effected by two lift springs 148, which are disposed in bores 150 formed in the gate portion 108 of the body 102 and which are in contact with the gate 112 and maintained in a compressed state when the gate 112 is in a lifted or open position. While two lift springs 148 are shown, a single or at least one spring can be used. Moreover, the one or two lift springs may be replaced by another resilient element that provides a restoring force when compressed, including passive elements, e.g., that are made of collapsible and resilient materials such as rubber, or active elements such as pneumatic and/or hydraulic actuators and the like. When the retention pin 138 is retracted sufficiently for the tip 144 to clear the elongate slot 146, as can be seen in FIG. 9, the gate 112 is free to drop and moves towards the closed position by force of the lift springs 148. In the illustrated embodiment, a handle 152 (FIG. 2) attached to an end of the solenoid actuator rod opposite the release pin 134 may be manually pulled to retract the release pin 134 and cause the release of the gate 112 as described above.

Figure 10:
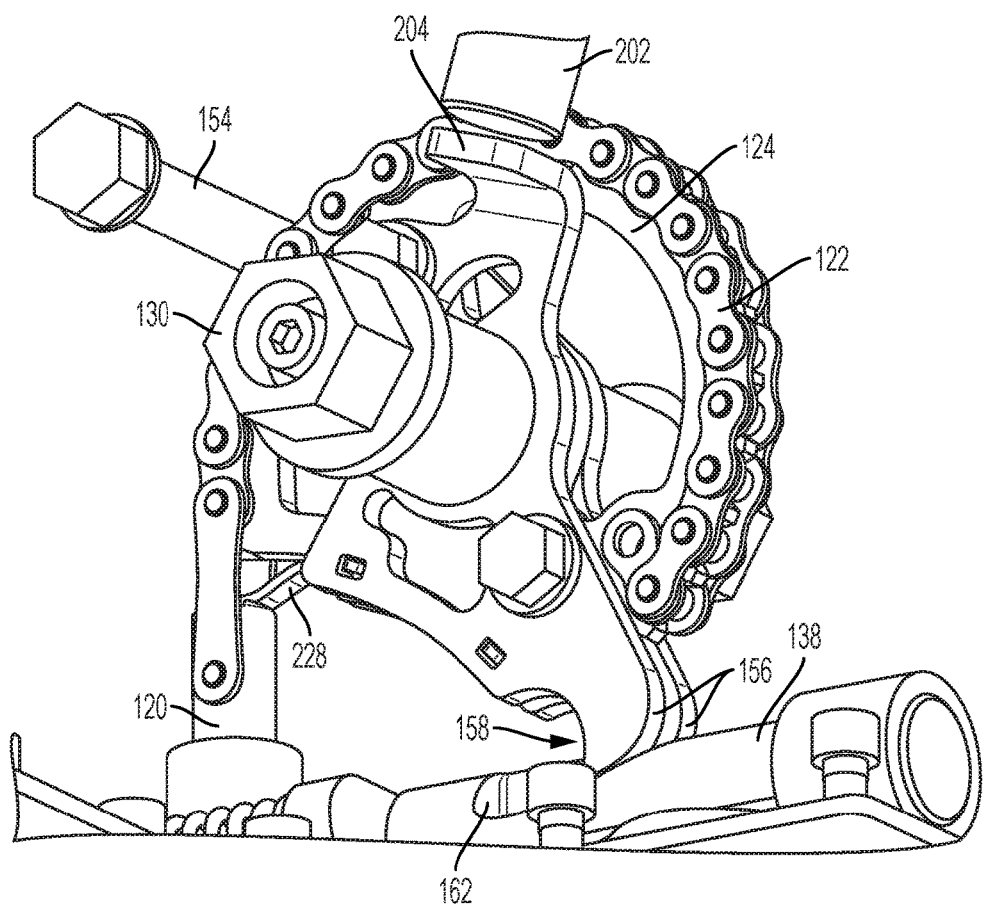
FIG. 10 is an outline view of a linkage mechanism of the valve of FIG. 1, shown removed from surrounding valve structures.
Figure 11:
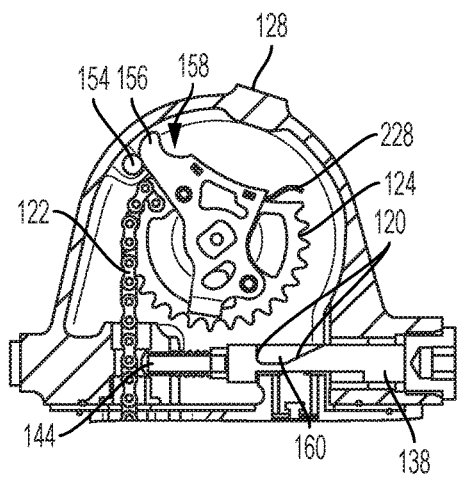
FIGS. 11-14 are views of the linkage mechanism in different operating positions.

When the ASV 100 is in the triggered or closed position, it may be reset or rearmed manually. To accomplish this, a user may engage the driver 130, for example, with a wrench, and turn the driver 130 in a resetting or winding direction, for example, in a clockwise direction in accordance with the orientation of parts shown in FIG. 10. The driver 130 is rotatably connected with the lift axle 126 such that rotation of the driver 130 causes the sprocket 124 to also rotate. For example, when rotating the driver 130 in the direction for resetting the valve, the sprocket 124 in the orientation shown in FIG. 2 will rotate clockwise to wind the chain 122 onto the sprocket 124 and thus pull on the lift rod 120 to raise the gate 112.

A sequence of positions for raising the gate 112 or, stated differently, for resetting the ASV 100 is shown in FIGS. 11-14. In reference to these figures, it can be seen that the sprocket 124 is rotated to lift the gate 112 and to also reset an armed position for the retention pin 138, similar to the cocking mechanism for a gun. In a first position, shown in FIG. 11, the sprocket 124 is at its left most rotational position as the springs 148 (FIG. 9) have already pushed the gate 112 to its lowermost or closed position. In this position, the chain 122 has a minimal length of engagement with the sprocket 124 as the lift rod 120 is in its most extended position with respect to the actuator portion 110. Rotation of the sprocket 124 is limited by a stop 154 that is engaged by a pawl 156. The pawl 156 has an elongate shape and a contoured tip 158. The pawl 156 is connected to and arranged to rotate along with the sprocket 124 such that the contoured tip 158 sweeps an arc at a radius that lies beyond an outer periphery of the sprocket 124 as the sprocket rotates.

Figure 12:
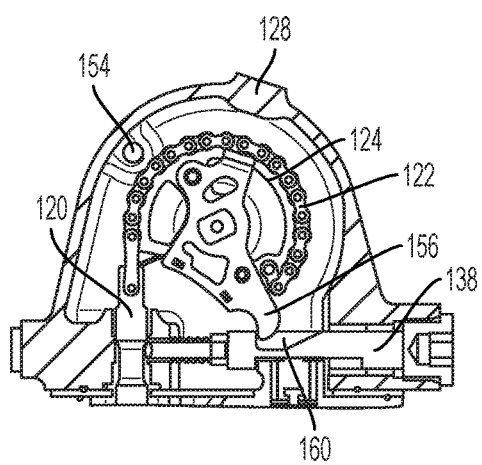
Figure 13:
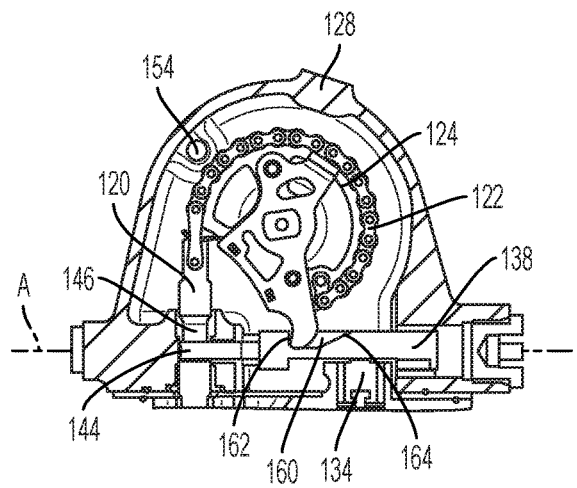

For resetting the ASV 100, the sprocket 124 and pawl 156 are rotated in unison by about 180 degrees from the stop 154 until the tip 158 contacts a contoured notch 160 in the retention pin 138. The notch 160 includes a push surface 162, which is disposed perpendicularly relative to a longitudinal axis, A, of the retention pin 138, along which the retention pin 138 can slide, as described above, and a clearance surface 164, which is disposed at an angle relative to the longitudinal axis A. As can be seen in FIG. 12, as the pawl 156 is rotated, the tip 158 is swung into the notch 160 and contacts the push surface 162. Continued rotation of the driver 130 and, thus, continued rotation of the sprocket 124 and the pawl 156 will cause the tip 158 to push into and begin moving the retention pin 138 towards the lift rod 120, while the springs 140 (FIG. 4) are being compressed as they resist the motion. At the same time, rotation of the sprocket 124 also causes a lifting of the gate 112 as the chain 122 is wound over an increasing segment of the sprocket 124.

At the position shown in FIG. 12, the tip 144 of the retention pin 138 begins to enter the elongate slot 146 at its top portion in the lift rod 120. Continued rotation of the sprocket 124 inserts a larger portion of the retention pin 138 into the slot 146 as the lift rod 120 continues its motion such that, in the position shown in FIG. 13, the tip 144 of the retention pin 138 has been fully inserted into the elongate slot 146 and is disposed at a bottom portion thereon, in the orientation shown in FIG. 13. While in this over-travel position, the retention pin 138 is not yet retaining the lift rod 120 and gate 112, but is mechanically positioned to prohibit a downward motion of the gate 112. Moreover, at this position, the release pin 134 is allowed to snap into its opening in the retention pin 138 and lock its position.

Figure 14:
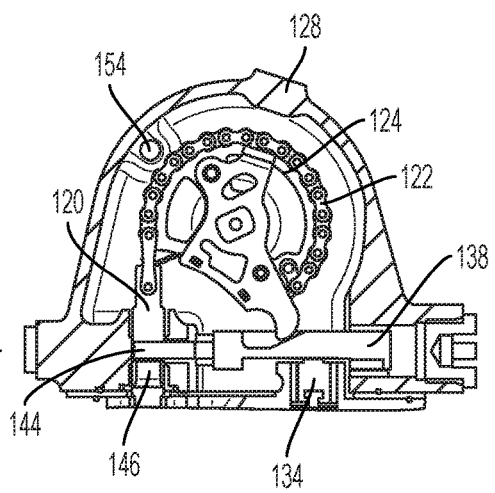

When force on the sprocket 124 is relaxed following the locking of the release pin 134 into the retention pin 138, which is usually verified by the user by an audible sound or "click," the sprocket 124 begins to rotate in the opposite direction (counter-clockwise, in the orientation shown in FIG. 14) at it is pulled by the chain 122. The force on the chain 122 results from elongation of the now compressed springs 148 (FIG. 9) and the force they apply on the chain 122 through the body of the gate 112 and the lift rod 120. So as not to interfere with the retention pin 138 that is now locked in position, the pawl 156 is allowed to swing out of the notch 160 by providing a clearance between the tip 158 and the clearance surface 164, as shown in FIG. 14. This counter-rotation of the sprocket 124 and pawl 156 stops when the top of the elongate slot 146 engages the top of the tip 144 of the retention pin 138, in the position shown in FIG. 14, and also in the enlarged detail shown in FIG. 3.

INDUSTRIAL APPLICABILITY

The present disclosure is applicable to internal combustion engines and, more particularly, to ASV valves disposed to fluidly isolate engine cylinders from incoming air to prevent undesired operation of the engine.

Various structures for arming and resetting the ASV 100 are described above. The ASV 100 further includes additional structures and features that improve its performance and increase its service life. One such feature is a position sensor 202, which can be mounted on the cover 128. The position sensor 202, which can be embodied as a proximity sensor, is arranged to sense a target 204 and provide a signal when the target 204 is in a position at which the gate 112 is locked in its open position, as shown in the enlarged detail of FIG. 10. In the embodiment shown, the target 204 is a flat surface on a metal protrusion or shelf that is oriented perpendicular to a plane defined by the sprocket 124 and is positioned at a radial location relative to the sprocket 124 that causes the target 204 to be disposed in front of the sensor 202 when the gate 112 is in its locked open or armed position.

Figure 5:
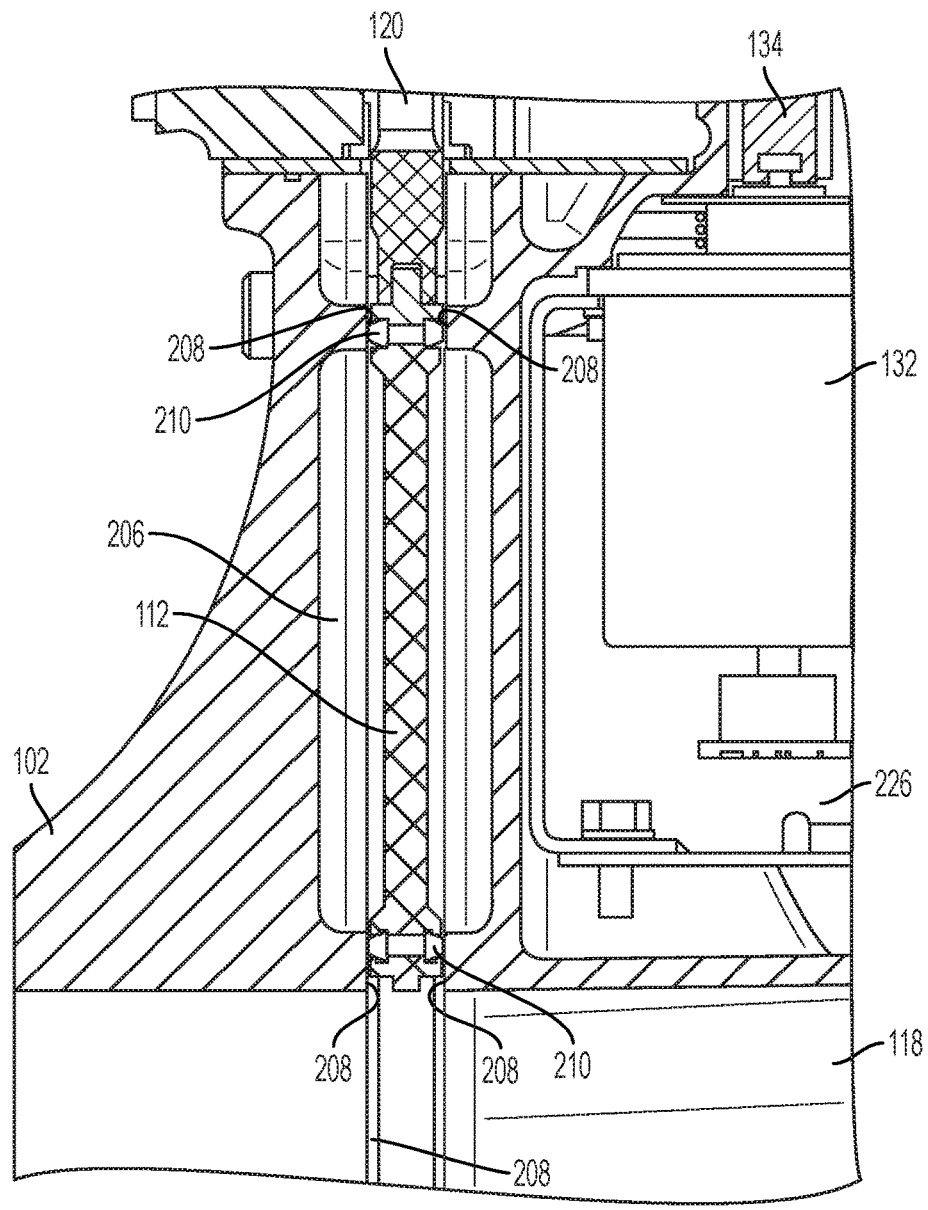
FIG. 5 is an enlarged detail of the cross section of FIG. 2.
Figure 6:
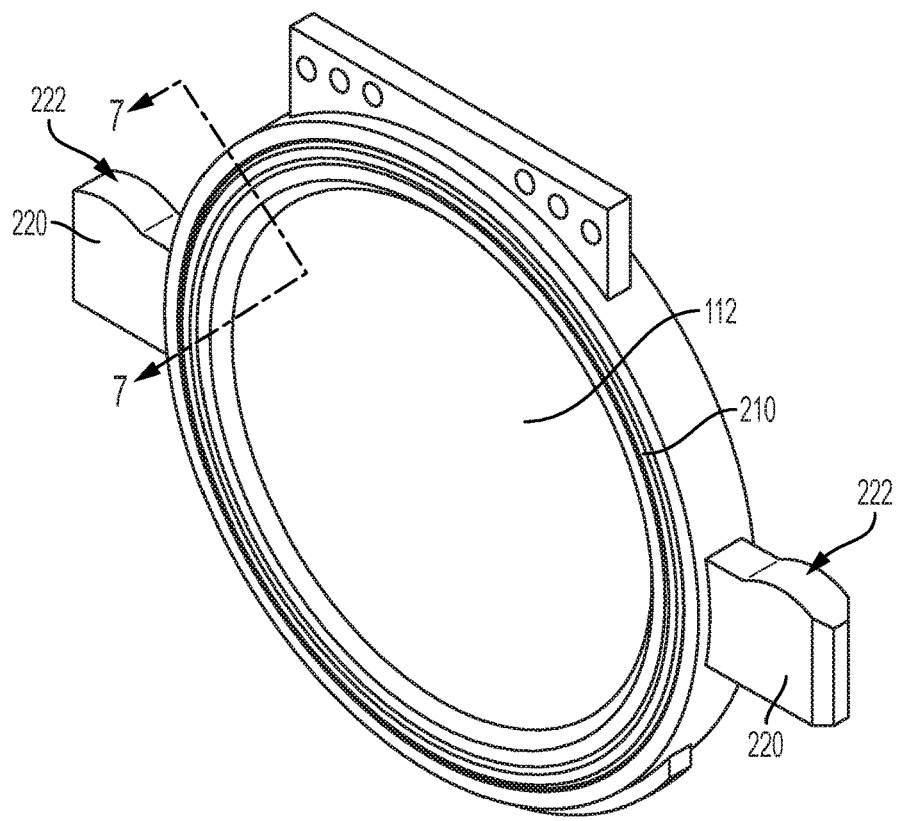
FIG. 6 is an outline view of a gate element.
Figure 7:
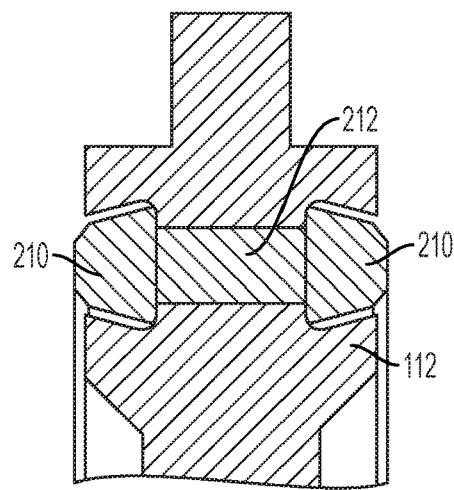
FIG. 7 is an enlarged cross section through the gate element of FIG. 6.
Figure 15:
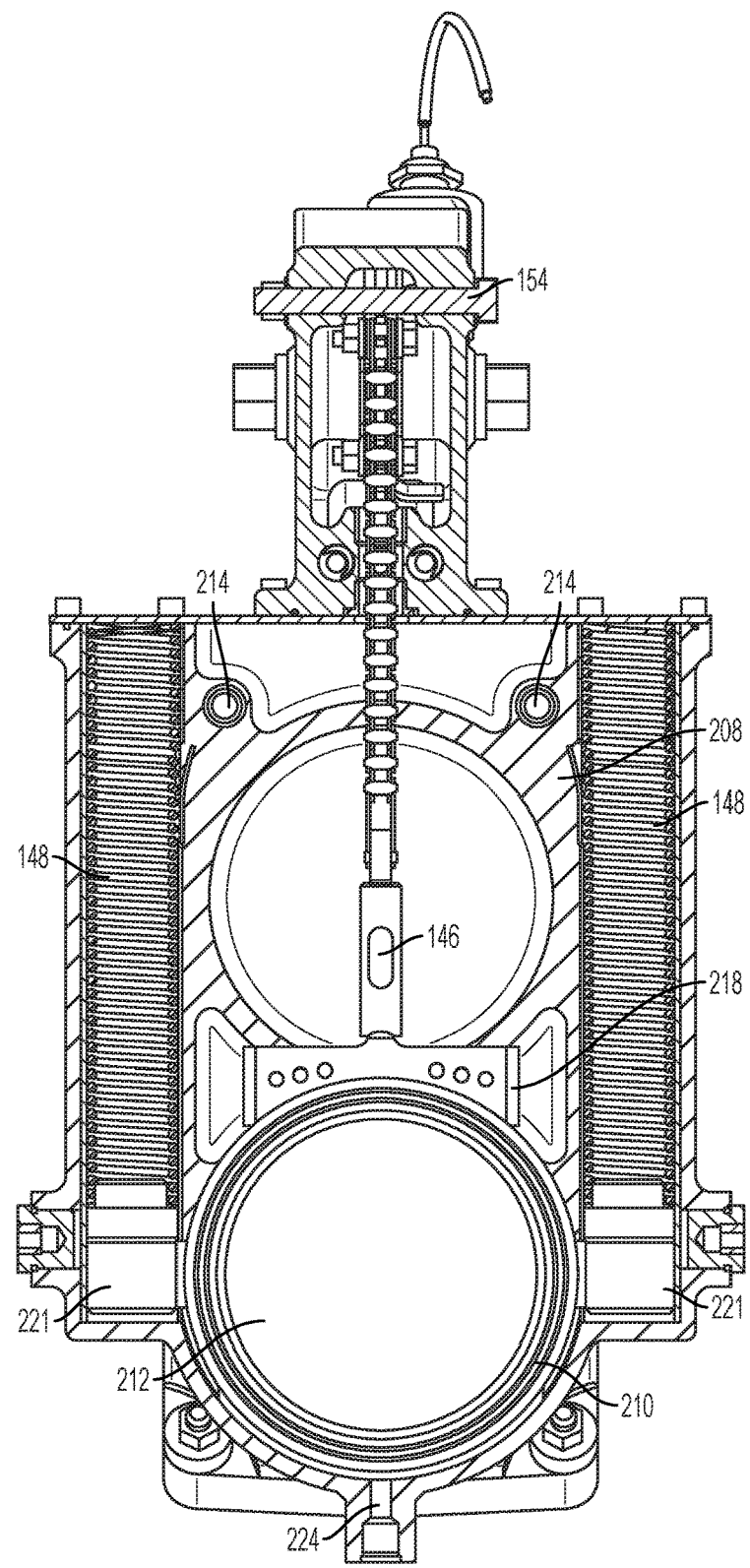
FIG. 15 is a cross section of the valve shown in FIG. 1.

Another feature of the ASV 100 includes an expansion chamber 206 and two annular sealing surfaces 208, which form a figure "8" and which discourage ingress of compressed air in the air passage 118, which may also contain other gasses such as recirculated exhaust gas and/or a gaseous engine fuel, into a cavity that houses the sprocket 124, chain 122 and a portion of the actuator 132. As shown in FIG. 5, the expansion chamber 206 is a blind chamber or cavity formed in the body 102 that is can enclose the gate 112 when the gate 112 is in its open position. The gate 112 includes two face seals 210, one on either side of the gate 112, each of which having a generally circular shape that surrounds a periphery of the gate 112, as shown in FIGS. 6 and 15.

During operation, the gate 112 can form a complete seal around its entire periphery and on both its upstream and downstream sides relative to the air passage 118. In the event any air or gas/air mixture leaks past the seals 210, especially when the gate 112 is in its open position, the expansion chamber 206 will serve to cool, expand and condense any fluids that are dissolved in the inlet air mixture to avoid contamination, corrosion and damage to the components operating the gate opening mechanism. For example, the inlet air mixture can include water vapors and also combustion by-products when exhaust gas recirculation is used, which by-products can include Sulphur oxides.

The seals 210 can be string seals accommodated in a channel, and may be formed by over-molding a seal material, such as a fluoro-elastomer, directly onto a gate 112, whereby both sides of the seal 210 can be formed in a single injection molding operation where the material passes from one side of the gate to the other through molding channels 212 formed peripherally around the gate 112, as shown in the cross section through the gate 112 in FIG. 9. In an alternative embodiment, the seals 210 may be made of a different material such as copper, graphite, ceramics and the like, which have an acceptable sealing performance and can withstand operation and maintain their sealing properties after prolonged operation at higher temperatures, for example, 300 deg. C., even in the presence of corrosive substances, without appreciable loss of their sealing ability.

Figure 8:
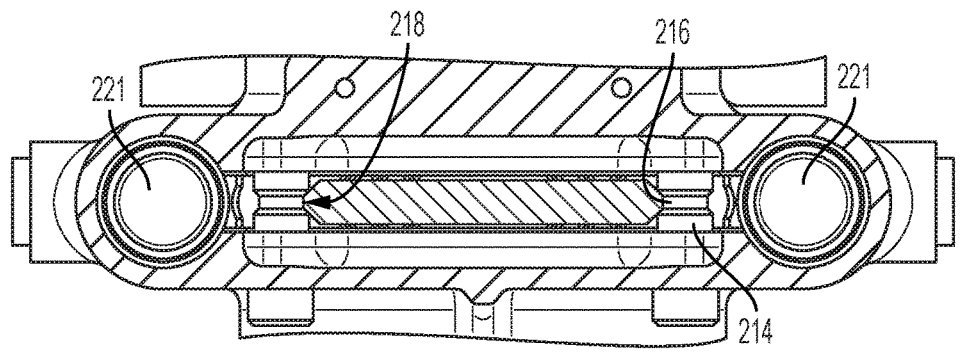
FIGS. 8 and 9 are cross sections from different perspectives of a gate portion of the valve shown in FIG. 1.

For avoiding rattling and wear of the gate 112 when in the open or armed position due to vibration during operation, the ASV 100 further includes a plurality of resilient rollers 214. The placement of the rollers 214 for the illustrated embodiment can be seen in FIG. 15 from a front perspective, in the cutaway view of FIG. 8 from a top perspective, and in cross section from the front perspective in FIG. 9. The rollers 214 form a central channel 216 that engages a ridge 218 of the gate 112 such that motion and/or rotation in any direction except for the linear direction in which the gate lowers (downward, in the orientation of FIG. 9) is prevented or dampened by the resilience of the material of the rollers 214, which may be made of rubber, PTFE, Viton®, silicone, or the like.

To improve the operation of the ASV 100, the sliding mechanism between the gate 112 and the gate portion 108 of the body 102 includes a self-centering mechanism that ensures smooth and reliable valve activation regardless of installation or operation orientation of the ASV 100. More specifically, the gate 112 includes two diametrically opposite arms 220 (FIG. 6), which protrude radially with respect to the gate 112 and which interact with guides 221 (FIG. 9) that are slidably disposed within the bores 150. The guides 221 matingly engage contoured surfaces 222 formed on each of the arms 220. The contoured surfaces 222 have a generally smooth concave shape, which approximates a circular segment such that an axial force applied by the springs 148 onto the gate 112 through the guides 221 and the arms 220 tends to center the guides 221 within the bores 150. As can be seen from FIGS. 9 and 15, the guides 221 also act as spring guides for the springs 148 and are thus subject to motion by a spring force when the springs 148 are extending, which motion is transferred to the gate 112.

For facilitating assembly of the various components in the ASV 100, a bore 224 is provided in the body 102. The bore 224, which is plugged during operation of the ASV 100, is positioned along the air passage 118 at a position that overlaps the gate 112 and is disposed at a location that is diametrically opposite the lift rod 120. In this way, a tool, for example, a slender rod or bolt, can be inserted through the bore 224 and push the gate 112 towards its open position, and retain the same in that position while the remaining structures such as the sprocket 124 and chain 122 can be assembled.

For prolonging the service life and improving the viability and operation of the actuator 132, the ASV 100 includes heat shields 226 that at least partially surround the actuator 132 to shield the same from heat that may be emanating from the body 102 of the ASV 100 during operation. Moreover, the actuator 132 is placed such that the axis along which the retention pin 134 is actuated is parallel with the axis along which the gate 112 can move relative to the body 102. In this way, the length and orientation of the mechanical path of transmission of motion can be reduced and the actuator 132 can be placed closer to a center of mass of the ASV 100, which reduces the vibration and wear that the actuator might otherwise be subjected to.

To help prevent galling and rattling of internal components of the ASV 100 during operation, the ASV 100 further includes a leaf spring 228 that extends generally radially from the sprocket 124 and is disposed at a partially compressed between the sprocket 124 and a top surface of the lift rod 120, as shown in FIG. 2. Any other retention structure can be used in place of the leaf spring 228 to provide a resilient stop member to prevent or dampen vibration of the sprocket 124 and surrounding structures of the ASV 100. In this way, rotation of the sprocket 124 due to vibration during operation of the ASV 100 is minimized or avoided.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An air shutoff valve for use on an internal combustion engine, comprising:
   a body having an inlet portion forming an inlet opening, an outlet portion forming an outlet opening, a gate portion and an actuator portion;
   the body forming an air passage that fluidly connects the inlet opening and the outlet opening;
   a gate slidably disposed in the gate portion of the body, the gate being selectively moveable between an armed position and a triggered position, in which triggered position the gate is disposed in the air passage and fluidly blocks the outlet opening from the inlet opening;

a lift rod connected to the gate, the lift rod including a transverse opening;

a retention pin slidably disposed in the actuator portion of the body, the retention pin having a tip extending through the transverse opening in the lift rod when the gate is in the armed position;

a release pin disposed in a release opening formed in the retention pin when the gate is in the armed position, the release pin preventing sliding motion of the retention pin relative to the body when the release pin is in an extended position;

an actuator connected to the release pin and operating to move the release pin from the extended position to a retracted position, in which the release pin is clear of the retention pin;

at least one spring disposed between the body and the retention pin, the at least one spring disposed to urge the retention pin in a direction away from the lift rod; and at least one lift spring disposed between the body and the gate, the at least one lift spring disposed to urge the gate towards the triggered position.

2. The air shutoff valve of claim 1, further comprising a linkage mechanism that operates to mechanically associate a position of the gate with a position of the retention pin relative to the body.

3. The air shutoff valve of claim 2, wherein the linkage mechanism includes a driver, and wherein rotation of the driver is configured to move the gate from the triggered position to the armed position and also to move the retention pin towards the transverse opening in the lift rod to lock the gate in the armed position.

4. The air shutoff valve of claim 3, wherein the linkage mechanism includes a sprocket rotatably mounted on the body and connected to the driver such that rotation of the driver causes a corresponding rotation of the sprocket.

5. The air shutoff valve of claim 4, wherein the linkage mechanism further includes a chain, which is meshably engaged with the sprocket, the chain having one end connected to the sprocket and another end connected to an end of the lift rod such that rotation of the driver and sprocket in a winding direction causes the chain to pull onto the lift rod and move the gate from the triggered position towards the armed position.

6. The air shutoff valve of claim 1, wherein the body further includes at least one bore disposed in the gate portion and extending parallel to a travel direction of the gate, and wherein the at least one bore includes the at least one lift spring.

7. The air shutoff valve of claim 6, wherein the gate includes an arm that extends into the at least one bore, wherein a plug is slidably disposed within the at least one bore and contacts the arm, and wherein the at least one lift spring is compressively disposed between an end of the at least one bore and the plug.

8. The air shutoff valve of claim 4, further comprising a pawl connected to the sprocket and extending radially outwardly therefrom, the pawl being arranged to contact a pocket formed in the retention pin and to push the retention pin towards the transverse opening as the sprocket rotates in the winding direction.

9. The air shutoff valve of claim 1, further comprising an expansion chamber formed in the body and surrounding at least a portion of the gate when the gate is disposed in the armed position.

10. The air shutoff valve of claim 1, wherein the transverse opening is a slot extending through the lift rod.

11. An air shutoff valve for an internal combustion engine comprising a gate valve element slidably disposed within a body of the valve and operating to selectively fluid connect or block an air passage, the gate valve element moving along a guillotine axis between a retracted position, in which the air passage is clear, and an extended position, in which the air passage is blocked, the air shutoff valve further comprising:

a linear actuator operating between a default, extended actuator position and an active, retracted actuator position;

a release pin disposed to move with the linear actuator between the extended and retracted actuator positions;

a retention pin slidably disposed in the body of the valve, the retention pin having an opening that accepts therein a portion of the release pin;

at least one spring disposed between the body of the valve and the retention pin, the at least one spring urging the retention pin in one direction;

a lift rod connected to the gate valve element, the lift rod having an elongate slot that accepts therein a tip of the retention pin; and at least one lift spring disposed between the body of the valve and the gate valve element, the at least one lift spring urging the gate valve element towards the extended position.

12. The air shutoff valve of claim 11, wherein in an armed state:

the linear actuator is in the extended position;

the release pin is disposed in the opening of the retention pin, thus preventing motion of the retention pin relative to the body of the valve and the lift rod;

the at least one spring is compressed;

the tip of the retention pin is disposed within the elongate slot in the lift rod, thus preventing the lift rod from moving relative to the body of the valve; and the at least one lift spring is compressed; and the gate valve element is disposed in the retracted position.

13. The air shutoff valve of claim 12, wherein during a trigger event:

the linear actuator is activated to move to the retracted position at least temporarily;

the release pin moves to be clear of the opening of the retention pin, thus allowing motion of the retention pin relative to the body of the valve and the lift rod, at least temporarily;

the at least one spring is extended to push the retention pin away from the lift rod;

the tip of the retention pin clears the elongate slot in the lift rod, thus allowing the lift rod to move relative to the body of the valve; and the at least one lift spring is extended to push the gate valve element from the retracted position to the extended position.

14. The air shutoff valve of claim 13, wherein in a triggered state:

the linear actuator is free to move to the extended position;

the release pin is free to move into the opening of the retention pin when the opening becomes aligned with the release pin; and the gate valve element is disposed in the extended position.

15. The air shutoff valve of claim 14, further comprising a sprocket rotatably disposed on the body, and a chain meshed with the sprocket and connected between the sprocket and an end of the lift rod, the sprocket further including a driver rotatably associated therewith and a pawl connected with the sprocket and extending radially outwardly therefrom, and wherein when transitioning from the triggered state to the armed state:

a user rotates the driver, thus rotating the sprocket in a winding direction;

the chain is taken up by the sprocket and pulls the lift rod and the gate valve element towards the retracted position;

the pawl rotates and engages a notch in the retention pin, thus pushing the retention pin towards the lift rod;

the opening of the retention pin aligns with the release pin, and the release pin engages the opening;

the tip of the retention pin enters the elongate slot;

the at least one spring is compressed; and the at least one lift spring is compressed.

16. An air shutoff valve for an internal combustion engine, comprising:

a body forming an air passage that fluidly connects an inlet opening with an outlet opening;

a gate slidably disposed in the body and being selectively moveable along a gate axis between an armed position and a triggered position, in which the air passage is fluidly blocked;

a lift rod connected to the gate and including a transverse opening;

a retention pin slidably disposed in the body along a retention axis and having a tip extending through the transverse opening in the lift rod when the gate is in the armed position;

a release pin disposed in a release opening formed in the retention pin when the gate is in the armed position, the release pin preventing sliding motion of the retention pin relative to the body when the release pin is in an extended position;

an actuator connected to the release pin and operating to move the release pin along an actuator axis from the extended position to a retracted position, in which the release pin is clear of the retention pin;

at least one spring disposed between the body and the retention pin, the at least one spring disposed to urge the retention pin in a direction away from the lift rod; and at least one lift spring disposed between the body and the gate, the at least one lift spring disposed to urge the gate towards the triggered position;

wherein the gate axis and the actuator axis are parallel; and wherein the actuator axis and the retention axis are perpendicular.

17. The air shutoff valve of claim 16, wherein the gate, actuator and retention axes are coplanar.

18. The air shutoff valve of claim 16, further comprising a linkage mechanism that operates to mechanically associate a position of the gate with a position of the retention pin relative to the body, the linkage mechanism comprising:

a driver, wherein rotation of the driver is configured to move the gate from the triggered position to the armed position and also to move the retention pin towards the transverse opening in the lift rod to lock the gate in the armed position;

a sprocket rotatably mounted on the body and connected to the driver such that rotation of the driver causes a corresponding rotation of the sprocket; and a chain being meshably engaged with the sprocket, the chain having one end connected to the sprocket and another end connected to an end of the lift rod such that rotation of the driver and sprocket in a winding direction causes the chain to pull onto the lift rod and move the gate from the triggered position towards the armed position;

wherein an axis of rotation about which the sprocket rotates is perpendicular to a plane defined by the gate axis and the actuator axis.

19. The air shutoff valve of claim 18, further comprising a pawl connected to the sprocket and extending radially outwardly therefrom, the pawl being arranged to contact a pocket formed in the retention pin and to push the retention pin towards the transverse opening as the sprocket rotates in the winding direction.

20. The air shutoff valve of claim 16, further comprising an expansion chamber formed in the body and surrounding at least a portion of the gate when the gate is disposed in the armed position.

* * * * *